May 23, 1967 R. M. NELDEN 3,320,748
FLUID COUPLING CONTROL MEANS
Filed Oct. 1, 1965 3 Sheets-Sheet 1

Inventor:
RICHARD M. NELDEN
By Wilson, Settle, Batchelder & Craig
Att'ys.

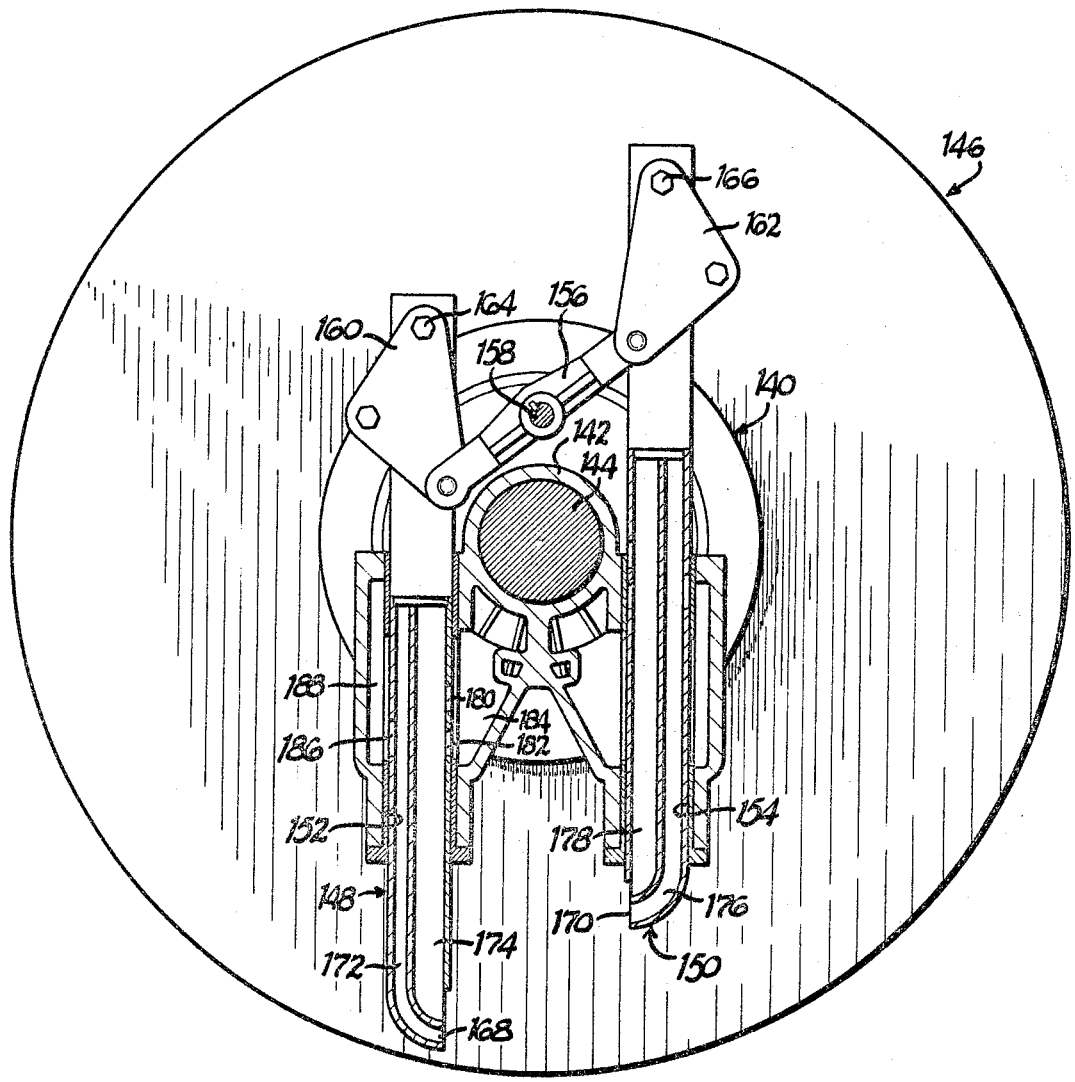

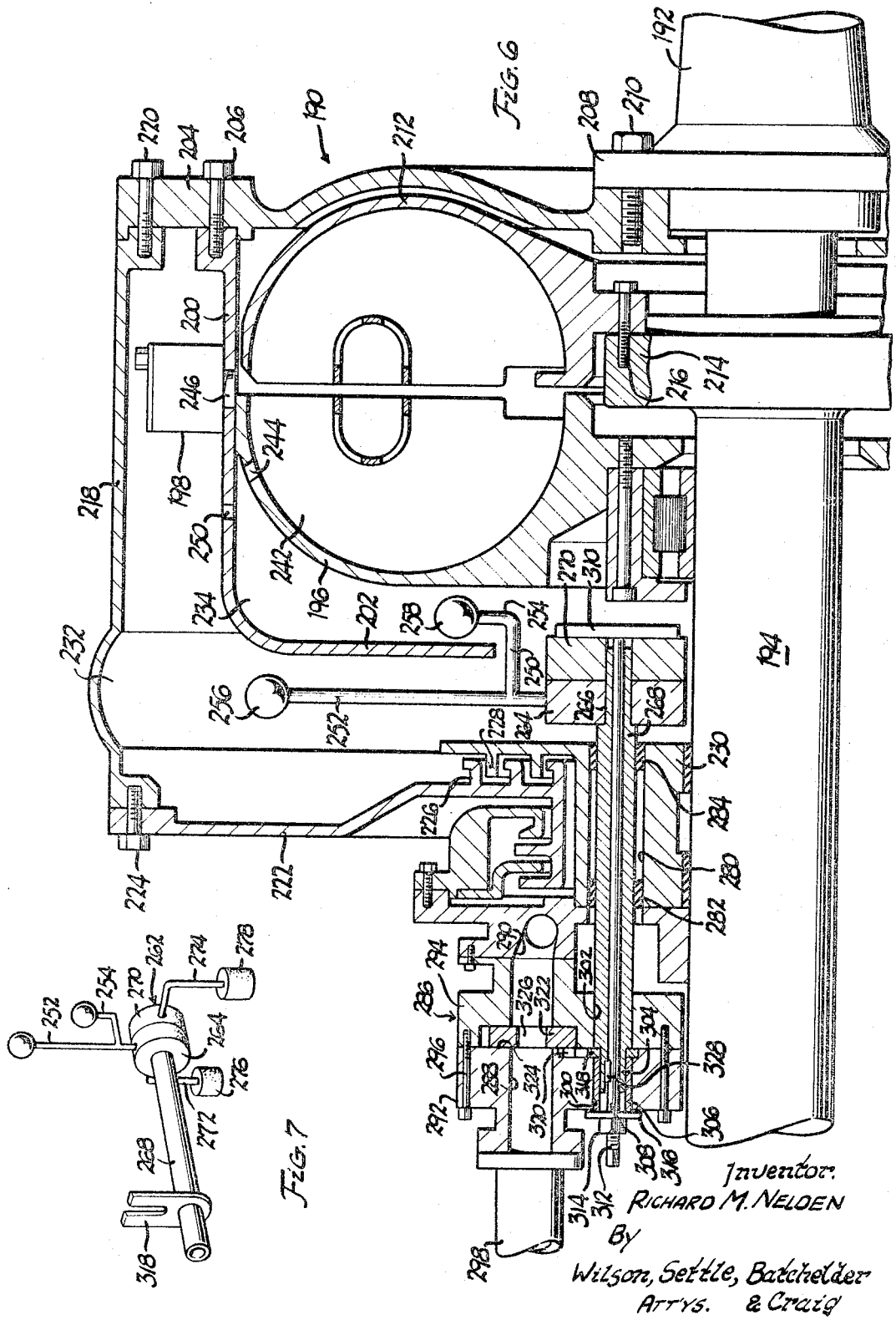

United States Patent Office 3,320,748
Patented May 23, 1967

3,320,748
FLUID COUPLING CONTROL MEANS
Richard M. Nelden, Southfield, Mich., assignor to American Radiator & Standard Sanitary Corporation, New York, N.Y., a corporation of Delaware
Filed Oct. 1, 1965, Ser. No. 492,009
15 Claims. (Cl. 60—54)

ABSTRACT OF THE DISCLOSURE

The type of fluid coupling with which the present invention is concerned is for the most part conventional in that there is provided an impeller connected with a drive shaft and a runner connected with a driven shaft. The impeller and runner are located in close juxtaposition with one another and means are provided for circulating fluid into the space between the two juxtaposed elements.

The present invention relates to a fluid coupling control means, and more particularly to a mechanical structure for sensing the fluid level within a fluid coupling, the mechanical structure being actuated at predetermined fluid levels to control the supply of fluid to the coupling.

Means are provided to control the level of fluid within the unit. The fluid coupling comprises a working chamber including driving and driven vaned elements. A work chamber reservoir is located adjacent the vaned elements for rotation with the driving element. Fluid flow between the work chamber reservoir and the work chamber via fluid passage means. A scoop chamber for fluid is located adjacent the work chamber reservoir and rotates with the work chamber reservoir. Fluid communication is provided between the work chamber reservoir and the scoop chamber. A scoop tube is provided in the scoop chamber and is connected to a cooler for receiving fluid. Fluid flows from the cooler back to the working chamber. An external fluid reservoir is also provided for delivering fluid to the working chamber.

The fluid in the work chamber reservoir and the scoop chamber forms a fluid ring at the outer periphery of the chambers during operation of the fluid coupling as the result of centrifugal force. An arm is pivotally mounted in each of the work chamber reservoir and scoop chamber. Each arm has a free end extending radially outwardly towards the outer periphery of the chambers. The arms terminate short of the outer periphery. The arms are urged to a normal position by, for example, gravity. When the fluid rings contact the free ends of the arms, the arms are pivoted away from their normal positions. This occurs when the thickness of the rings exceeds the distance between the free ends of the arms and the outer peripheries of the chambers. Control means are operatively connected to the arms and are actuated by movement of the arms. The control means may be, for example, a valve which controls flow of fluid to the working chamber from the reservoir. Alternately, the control means may be a visible or audible alarm to indicate to an operator of the fluid coupling that he should take action to manually control the fluid level.

Background of the invention

In operation of such fluid couplings, it is desirable to control the level of the fluid within the unit. In the past, control of the fluid level has been attempted by means of a pressure valve. However, difficulties have been encountered in connection with the use of a pressure valve because systems which are dependent on the pressure within a fluid coupling are inherently inaccurate due to the fact that the pressure drop changes with temperature variations of the fluid within the coupling. Electrical devices for sensing the fluid level have also been difficult to develop because of the electrical conductivity characteristics of the fluid.

The present invention solves this problem by providing a mechanical structure for sensing the fluid level, the mechanical structure incorporating a swingable arm which is pivoted by the fluid when the fluid is at predetermined levels, the pivoting of the arm resulting in actuation of a fluid control mechanism. Pivoting of the arm is not affected by temperature variations or by other electrical or thermal properties of the fluid.

It is therefore an object of the present invention to provide a fluid coupling having mechanical means for directly sensing the level of fluid within the coupling.

Another object of the invention is to provide such a mechanical sensing structure which has a positive operation, the operation thereof not being affected by thermal or electrical characteristics of the fluid in the coupling.

A further object of the invention is to provide swingable arm means within a fluid coupling, one end of the arm means being for contact with the surface of fluid which rotates with a rotatable member of the coupling.

A still further object of the invention is to provide such a mechanical structure which is adaptable for operation of liquid level control means which may be electrical, pneumatic or hydraulic apparatus.

Other objects of this invention will appear in the following description and appended claims, reference being had to the accompanying drawings forming a part of this specification wherein like reference characters designate corresponding parts in the several views.

In the drawings:

FIGURE 4 is a sectional view of a scoop tube structure for utilization in a reversible fluid coupling;

FIGURE 6 is a sectional view of the upper half of a fluid coupling in which the liquid control structure has been modified; and FIGURE 7 is a perspective view of the liquid control structure assembly.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Figure 1:
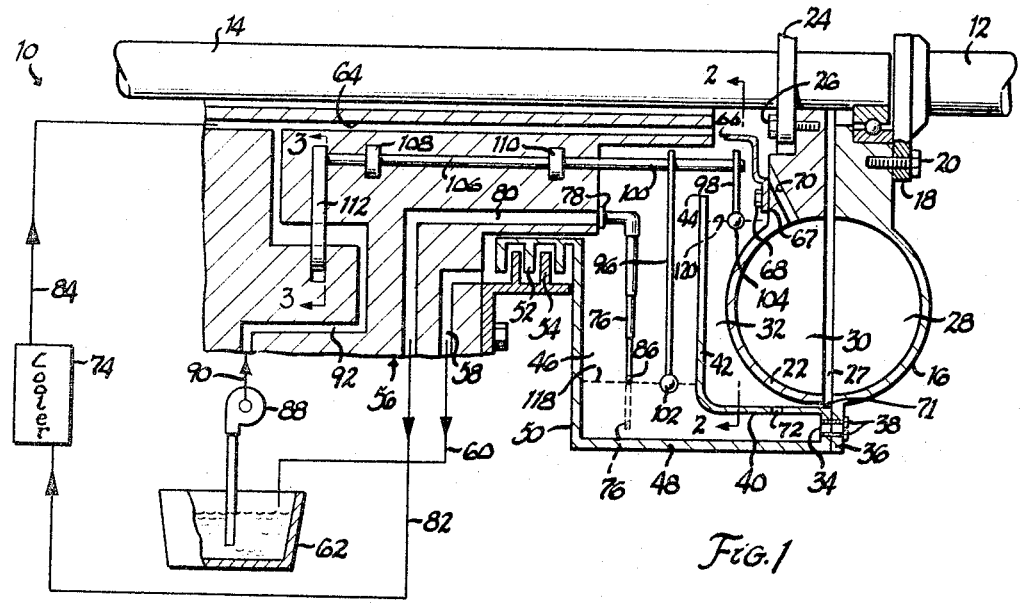
FIGURE 1 is a sectional view of the lower half of a fluid coupling and associated hydraulic circuitry incorporating fluid control means forming one embodiment of the present invention.

Referring to FIGURE 1, it will be noted that the lower half of a relatively conventional fluid coupling 10 is illustrated. The fluid coupling 10 is provided with an input shaft 12 and an output shaft 14. The input shaft 12 carries vaned impeller 16. The impeller 16 is secured to a flange 18 of the input shaft 12 by means of bolts 20 for rotation with the input shaft. The output shaft 14 carries a vaned runner 22. The runner 22 is secured to flange 24 of the output shaft by means of bolts 26 for rotation with the output shaft.

It will be noted that the impeller 16 and runner 22 are positioned in close juxtaposition with respect to one another. The impeller and runner define a work chamber 27 in the space occupied by impeller vanes 28 and runner vanes 30.

A chamber 32, hereinafter referred to as the work chamber reservoir, is formed by a shell having a cylindrical portion 34 bolted to a flange 36 of the impeller 16 by bolts 38. A circular wall 40 extends from the circular flange portion 34 and merges into a flat end wall 42 to complete the shell surrounding the runner and forming with the runner the work chamber reservoir 32. The end wall 42 terminates short of the output shaft 14 to define a central aperture 44.

A second chamber 46, hereinafter referred to as the scoop chamber, is formed adjacent to the work chamber reservoir 32. This chamber also acts as an oil reservoir capable of holding most if not all of the liquid required to fill the working circuit. The scoop chamber 46 is defined by the shell walls 40, 42 and a circular wall 48 which extends from the circular portion 34 and is spaced from the circular wall 40. The circular wall 48 merges into a flat end wall 50 which is spaced from the end wall 42 of the work chamber reservoir. The end wall 50 terminates in a sealing structure comprising spaced apart flanges 52 which are received between spaced apart flanges 54 of associated coupling manifold structure 56 to form a labyrinth seal. The structure 56 is fixedly mounted and serves to form the various conduits necessary for removing and supplying fluid to the working circuit. A passageway 58 leads from the above-mentioned labyrinth seal and drains by a line 60 to an external reservoir 62. The only time fluid will pass through the line 60 is during periods when the coupling is stopped and some fluid splashes into the seal. The fluid which passes into the reservoir 62 must be pumped back into the coupling when the coupling is again actuated.

Fluid is supplied to the work chamber 27 via a passageway 64 in the coupling manifold structure 56. The passageway 64 empties into a space above the runner 22. An annular S-shaped fill chamber member 66 is bolted to the runner flange 67 by bolts 68. The member 66 is positioned just below the outlet of the passageway 64 and forms, with the flange 67, a trough to receive fluid. A plurality of passageways 70 are provided in the flange 67 leading from the above-mentioned trough into the runner at a point adjacent the inner periphery thereof.

Fluid can pass between the work chamber 27 and work chamber reservoir 32 through the gap 71 between the runner 22 and circular wall 40. When the coupling is in operation, except when declutched, some fluid will always be present in the work chamber reservoir 32 as a result of the pressure created within the work chamber 27.

A restricted opening 72 is provided in the circular wall 40 for communication between the work chamber reservoir 32 and scoop chamber 46 which is customarily sized to contain sufficient oil to fill the work chamber. On large units the size of this scoop chamber for design reasons may have a limited capacity which is augmented by an auxiliary sump or reservoir. During periods of operation of the coupling, some fluid continuously passes through the opening 72 into the scoop chamber for circulation to an external cooler 74 to maintain the oil within the coupling at a desired temperature.

Fluid is removed from the rotating scoop chamber 46 by means of an adjustable scoop tube 76. The outlet 78 of the adjustable scoop tube is coupled to a passageway 80 in the coupling manifold structure 56. The passageway 80 extends, via line 82, to the cooler 74. Fluid circulated by the scoop tube exits from the cooler 74 via line 84 into the passageway 64 for return to the work chamber 27 as heretofore described.

The scoop tube 76 illustrated is a telescoping member and is radially adjustable to the position illustrated in solid lines or to the position illustrated in dotted lines. The mouth 86 of the tube, as illustrated in solid lines, is positioned for full declutching of the coupling wherein all of the oil from the work chamber is centrifugally held in the scoop chamber. In this position of the scoop tube, fluid is drained from the work chamber 27 and work chamber reservoir 32 through the opening 72 into the scoop chamber to thus result in a minimum amount of fluid being present in either the work chamber or work chamber reservoir.

When the scoop tube 76 is extended to the position illustrated in dotted lines, the coupling is fully clutched for operation at maximum torque. In this position, a minimum amount of fluid is present in the scoop chamber, thus making available a maximum amount of fluid for the work chamber and work chamber reservoir.

The external reservoir 62 is provided with a pump 88 for pumping make-up fluid into the work chamber 27. Line 90 extends from the pump 88 to a passageway 92 in the coupling manifold structure 56. The passageway 92 connects with the passageway 64 for eventual pumping of fluid into the work chamber 27 as heretofore described.

The present invention is concerned primarily with controlling the pumping of fluid from the external reservoir 62 into the work chamber 27. For this purpose, a valve structure and associated actuating means are provided for controlling fluid flow from the pump 88 to the work chamber 27. In this connection, the valve structure is not strictly speaking necessary because the control system may operate an alarm system to apprise the person responsible for the coupling of a condition within the coupling or the system may merely turn off the electrical power to the pump 88.

The actuating mechanism for the liquid control system comprises a pair of arms 96, 98 which are fixedly secured to a shaft 100. The arms 96, 98 extend downwardly as a result of gravity and each arm terminates in a weighted knob 102, 104. One of the arms 96 is relatively long and extends into the scoop chamber 46. The other arm 98 is relatively short and extends into the work chamber reservoir 32.

Figure 3:
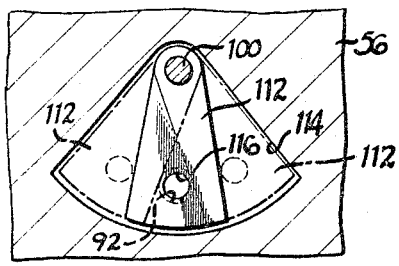
FIGURE 3 is a sectional view taken substantially along the line 3—3 of FIGURE 1 looking in the direction of the arrows illustrating a swing-type valve utilized in connection with the fluid control means.

The shaft 100 extends through a bore 106 in the coupling manifold structure 56. Bearings 108, 110 are provided for free movement of the shaft 100. Fixed to the end of the shaft 100 is a valve element 112. As best seen in FIGURE 3, the valve element 112 has a triangular shape and is received in a triangular recess 114. The recess 114 is somewhat larger than the valve element 112 to permit swinging of the valve element in either direction. The recess 114 is positioned at right angles to the passageway 92. The valve element 112 has a central opening 116 for registry with the passageway 92 when the valve element 112 is in a vertically aligned position. This condition occurs when both of the arms 96, 98 extend straight downwardly.

When either of the arms 96, 98 is shifted in either direction, the shaft 100 is pivoted and carries with it the valve element 112. When this occurs, as illustrated in dotted lines in FIGURES 2 and 3, the valve element 112 is shifted to a position where the opening 116 is out of registry with the passageway 92 thus blocking the flow of fluid from the pump 88 to the work chamber 27.

Operation of the liquid control system for limiting the oil supply to that required for normal circuit filling will be described in connection with two conditions of operation of the fluid coupling. The first condition is when the coupling is fully declutched. When the coupling is declutched, the scoop tube 76 is retracted to the position illustrated in solid lines in FIGURE 1. In this position, the impeller 16 is still driven by the input shaft 12. As a consequence, any fluid in the scoop chamber 46 will be thrown by centrifugal action to the outer periphery thereof as illustrated by the dotted line 118. In the declutched condition, it is desired to supply the work chamber 27 with little if any fluid. It is sometimes necessary to circulate some oil for circuit windage cooling when operating declutched but this would be a small amount of oil. Consequently, when the scoop chamber has been filled to the level of the line 118, it is desired that no further fluid be supplied to the work chamber 27 from the external reservoir 62. When the fluid reaches the level illustrated by the dotted line 118, the knob 102 contacts the rotating fluid causing the arm 96 to be pivoted and the valve element 112 to be swung to a closed position where no further fluid may be pumped from the reservoir 62 into the fluid drive.

Figure 2:
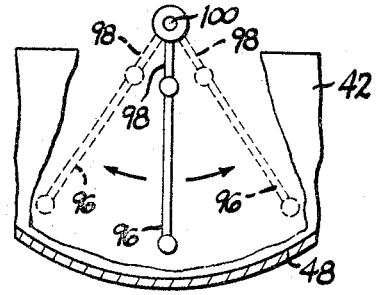
FIGURE 2 is a sectional view taken substantially along the line 2—2 of FIGURE 1 looking in the direction of the arrows with portions of the casing broken away for the purpose of clarity.

It will be noted in FIGURE 2 that by virtue of the shaft 100 being located off center with respect to the central axis of the coupling 10 the knob 102 moves closer to the circular wall 40 as the arm 96 is pivoted. Consequently, the arm 96 will not return by gravity to its normal position until the level of fluid in the scoop chamber has dwindled to a point beneath the dotted line level 118. This is advantageous in that it eliminates cycling of the valve as a result of minor variations of the fluid level in the scoop chamber. However, if desired, the wall 40 may be configured so that the knob 102 will always remain at the same distance therefrom and will thus return to its normal position whenever the fluid level is slightly less than that illustrated by the dotted line 118.

The second condition of the coupling is when the coupling is running at the fully clutched condition. When the coupling is fully clutched, the scoop tube 76 is extended to the position illustrated in dotted lines. The level of fluid in the scoop chamber 46 is thus maintained at a point beneath the knob 102. As a consequence, the knob 102 has no control over the fluid level in the coupling when the coupling is fully clutched.

When the coupling is fully clutched, it is desired to have a level of liquid in the work chamber reservoir 32 as indicated by the dotted line 120. With the fluid at this level, a sufficient amount of fluid is present in the work chamber 27 and in the work chamber reservoir 32 to permit operation of the coupling at maximum torque with minimum slip between the impeller 16 and runner 22.

Figure 5:
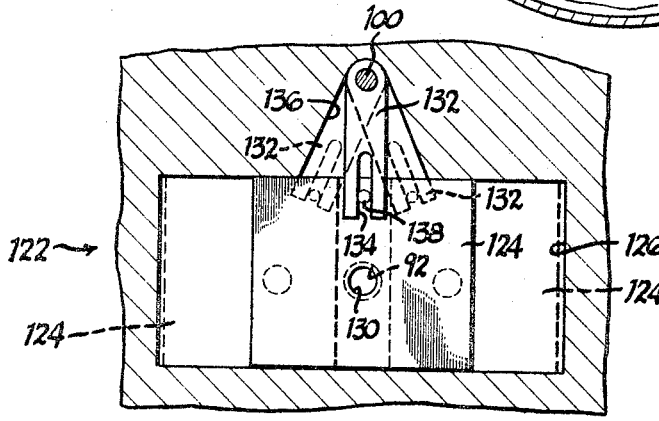
FIGURE 5 is a sectional view of a slide-type valve as an alternate to the swing-type valve illustrated in FIGURE 3.

An alternate embodiment of the valve structure actuated by the control mechanism is illustrated in FIGURE 5. The valve structure 122 is of the slide type and comprises a rectangular slidable valve element 124 which is received in a rectangular recess 126 positioned crosswise of the passageway 92 leading from the pump. The valve element 124 has a central opening 130 which registers with the passageway 92 when the valve element is positioned in the center of the recess 126. This condition occurs when the arms 96, 98 extend straight down. If the arms are pivoted to either the left or the right, the valve element 124 is moved as illustrated in dotted lines to position the opening 130 out of registry with the passageway 92 and thus close the passageway.

The means for actuating the valve element 124 comprise a fork member 132 having a recess 134. The fork member 132 is fixedly received on the shaft 100 for pivotal movement therewith. A triangular recess 136 is provided to receive the fork member 132. A pin 138 extends from the valve element 124 into the recess 134. Pivotal movement of the fork member 132 is thus translated to the valve element 124 via the pin 138 to cause longitudinal sliding thereof.

As previously mentioned, the fluid control device of the present invention is adapted to be operative in a fluid coupling which may operate in either the counterclockwise or clockwise direction. As shown by the solid arrows in FIGURE 2, the arms 96, 98 may be pivoted in either direction. FIGURE 4 illustrates one form of a scoop tube construction for a fluid coupling which permits the coupling to operate in either the counterclockwise or clockwise direction.

As will be noted in FIGURE 4, the scoop tube structure 140 is carried in a housing or manifold structure 142 which forms a part of the support for the shaft 144 of the coupling 146. The scoop tube structure 140 includes a pair of scoop tubes 148, 150. Each scoop tube 148, 150 is slidably received in a bore 152, 154. The scoop tubes are interconnected for reciprocal movement by means of a linkage comprising a central straight link 156 which is fixedly mounted at its center on a control shaft 158. Pivotally mounted at each end of the shaft 158 are triangular links 160, 162. Each link 160, 162 is pivotally mounted to the upper end of one of the tubes 148, 150 at 164, 166. It will be appreciated that turning of the shaft 158 causes raising of one of the tubes 148 or 150 and lowering of the other tube.

The mouths 168, 170 of the tubes face in opposite directions so that one of the tubes will be operative in the clockwise direction and one of the tubes operative in the counterclockwise direction. Each tube has a pair of passageways 172, 174, 176, 178. Referring to scoop tube 148, it will be noted that the inlet to passageway 172 is positioned beneath the inlet to the passageway 174. The passageway 174 is provided for quick fill of the work chamber of the coupling when the unit is rapidly clutched and the capacity of passageway 168 is momentarily exceeded. The passageway 174 has outlet ports 180, 182 which lead into passageway 184, passageway 184 leading directly to the work chamber of the coupling.

The passageway 172 has a port 186 which leads into a passageway 188 which eventually extends to a cooler and thence back into the coupling. It will be appreciated that after the level of fluid in the coupling drops beneath the inlet to the passageway 174, all fluid will thereafter pass through the passageway 172 to the cooler.

When the tubes are raised to the position illustrated by the tube 150, all of the ports from the tubes are closed preventing recirculation through the inactive tube from the active tube and the tube at this point is inoperative to control the fluid level within the coupling.

FIGURES 6 and 7 illustrate an alternate embodiment of the fluid level control mechanism. FIGURE 6 illustrates the upper half of a fluid coupling which is substantially of the same type as illustrated in FIGURE 1. The coupling 190 comprises an input shaft 192 and an output shaft 194. The input shaft 192 drives a vaned impeller 196 through members 200 and 204. The impeller 196 is secured to the circular wall member 200. A cylindrical shell member 202 extends inwardly from the wall member 200. The circular wall member 200 is bolted to outer casing member 204 by means of bolts 206. The casing member 204 is bolted to a flange 208 of the input shaft 192 by means of bolts 210. As a consequence, the impeller 196 rotates with the input shaft 192.

The output shaft 194 carries vaned runner 212. The runner 212 is secured to flange 214 of the output shaft by means of bolts 216 for rotation with the output shaft. The wall member 200 has an opening 246 over which is mounted a quick emptying valve 198 which may be opened to rapidly empty the work chamber when desired.

A cylindrical casing member 218 is bolted to the casing member 204 by means of bolts 220. The casing is completed by a circular casing member 222 which is bolted to the casing member 218 by bolts 224. The center of the casing 222 is provided with a labyrinth structure 226 which cooperates with a stationary labyrinth structure 228 of the coupling manifold structure 230 to form a labyrinth seal. As mentioned in connection with the FIGURE 1 embodiment, fluid drains from the labyrinth seal to the external reservoir when the coupling is completely stopped.

The casing thus described forms a shell around the coupling to define a scoop chamber or rotating reservoir 232. A work chamber reservoir 234 is provided coaxially with the scoop chamber 232. The work chamber reservoir is defined by the exterior surface of the impeller 196 and the wall member 200 and shell member 202.

Communication is provided between the work chamber reservoir 234 and the work chamber 242 by means of a plurality of openings 244 provided in the impeller walls. Fluid is delivered into the work chamber 242 via a passageway from the reservoir (not shown). An opening 250 is provided in the shell wall 200 for restricted flow of fluid from the work chamber reservoir into the scoop chamber 232 during normal operation of the coupling for movement from the scoop chamber to the cooler. During periods of declutching, fluid flows rapidly from the work chamber 242 via valve member 198.

Referring now to the fluid level control structure, attention is directed to both FIGURES 6 and 7. As in the FIGURE 1 embodiment, the control structure includes a pair of arms 252, 254. One arm 252 extends into the scoop chamber while the other arm 254 extends into the work chamber reservoir. Each arm has a knob 256, 258 on the end thereof. The arm 254 is directly connected to the arm 252 by arm portion 250. The arms 252, 254 control the level of fluid in the coupling as described in connection with the FIGURE 1 embodiment. However, means are provided to vary the position of the arms 252, 254 with respect to the outetrmost casing wall 218 and shell wall 238 to permit adjusting of the mechanism for adjusting the level of fluid in the scoop chamber and work chamber reservoir.

As will be noted, the arms 252, 254 extend upwardly. These arms are not directly actuated by gravity as is the case in the FIGURE 1 embodiment but are indirectly so actuated by means of a counterweight mechanism 262. The arm 252 is secured to a circular disc 264. The disc 264 has a central opening which is received on a reduced portion 266 of a shaft 268. The counterweight structure 262 includes a disc 270 which is also received on the reduced portion 266. The counterweight structure includes a pair of arms 272, 274 which extend laterally therefrom and then downwardly to terminate in weights 276, 278.

The shaft 268 extends through a bore 280 and is suitably journaled in bushings 282, 284.

A valve housing 286 is provided externally of the coupling. The valve housing has a passageway 288 which registers with a passageway 290 in the coupling manifold support structure. The passageway 290 eventually leads to the inlet to the coupling work chamber for supplying fluid thereto. A second passageway construction (not shown) is coupled to passageway 290 for receiving fluid from the cooler.

The valve housing 286 comprises a pair of flange members 292, 294 which are secured together by bolts 296. A conduit 298 is coupled to the inlet of the valve housing for receiving fluid from an external pump.

The valve flanges 292, 294 are provided with registering bores 300, 302 through which pass the external portion of the shaft 268. The external end 304 of the shaft is reduced and carries thereon a sleeve 306. The shaft 268 is hollow and a rod 308 extends through the entire length thereof. The rod carries at its inner end a disc 310 which abuts against the counterweight disc 270. The external end of the rod 308 is threaded at 312 and receives a nut 314 and washer 316.

A forked valve actuating element 318 is received on the reduced portion 304 between the sleeve 306 and the shoulder formed by the reduced portion. The forked element 318 extends upwardly and receives a pin 320 which extends from a slide valve element 322. The slide valve element 322 has a structure in accordance with the FIGURE 5 valve embodiment. The valve element 322 is received in a rectangular recess 324 formed in the valve housing member 294. The valve element 322 has a central opening 326 which registers with the opening through the valve housing when the valve element is positioned in the center thereof. As in the FIGURE 5 embodiment, movement of the valve element 322 to either side will close the valve and prevent fluid flowing therethrough into the work chamber of the coupling.

As will be appreciated, tightening of the nut 314 causes the washer 316 and disc 310 to force the various parts of the liquid control structure together in frictional engagement whereby the entire structure moves as a single unit. Thus, movement of either of the arms 252, 254 causes pivoting of the shaft 268 which carries with it the forked element 318 thus moving the valve element 322 to open or close the valve. The rod 308 is keyed to the interior of the shaft 268 by means of a key 328 whereby these two elements rotate together.

The arms 252, 254 may be adjusted with respect to the shell wall 200 and casing wall 218 to vary the distance of the knobs 256, 258 therefrom and thus vary the fluid level at which the valve 286 is closed. As will be noted, the shaft 268 is offset from the center line of the input and output shafts 192, 194. The casing member 218 and shell wall 200 have as their center the center line of the input and output shafts. Consequently, pivoting of the shaft 268 will cause the knobs 256, 258 to move closer to or further from the interior surface of the casing wall surface 218 and shell wall surface 200. In adjusting the mechanism, the nut 314 is threaded outwardly thus loosening the assembly and permitting the disc 264 to be pivoted to different positions on the shaft 268.

The counterweight disc 270 will maintain its position with the weights 276, 278 balancing each other and hanging downwardly to thus always retain the position illustrated in FIGURE 7. When the disc 264 has been adjusted to the desired position, the nut 314 is again tightened. The counterweight 262 will aways return the arms 252, 254 to whatever adjusted position is selected. During the adjusting procedure, the valve element 322 may be maintained in position by manual means, such as inserting a rod through the opening 326 to prevent lateral movement thereof during the adjusting procedure. Adjustment of the liquid control mechanism is, of course, done very infrequently, normally at the factory or when the coupling is installed in a system.

While counterweight means have been described in connection with centering of the arms 252, 254, it will be appreciated that other means, such as spring means, may be used to accomplish the same purpose. Additionally, the arms 252, 254 may be adjusted by other means, such as by providing these arms as telescoping members for adjustment relative to the distance thereof from the walls of the coupling interior.

Having thus described my invention, I claim:

1. Fluid level control means for a fluid coupling comprising a working chamber including driving and driven vaned elements, a chamber for fluid adjacent said vaned elements for rotation therewith, fluid in said chamber maintained as a fluid ring at the outer periphery of the chamber by a centrifugal force during rotation of the chamber, an arm pivotally mounted in said chamber and having a free end extending radially outwardly toward and terminating short of the outer periphery of the chamber, means urging said arm to a normal position, said fluid ring contacting the outer end of the arm and pivoting the arm away from its normal position when the thickness of the ring exceeds the distance between the end of the arm and the outer periphery of the chamber, and control means operatively connected to the arm and actuated thereby when the arm is pivoted.

2. Fluid level control means for a fluid coupling comprising a working chamber including driving and driven vaned elements, first and second chambers for fluid adjacent said vaned elements for rotation therewith, fluid in said chambers maintained as a fluid ring at the outer periphery of the chambers by centrifigural force during rotation of the chambers, an arm pivotally mounted in each of said chambers and having a free end extending radially outwardly toward and terminating short of the outer peripheries of the chambers, means urging said arms to a normal position, the fluid ring in each chamber contacting the outer end of its respective arm and pivoting the arm away from its normal position when the thickness of the ring exceeds the distance between the free end of the arm and the outer periphery of the chamber, and control means operatively connected to the arms and actuated thereby when one of the arms is pivoted.

3. Fluid level control means for a fluid coupling comprising a working chamber including driving and driven vaned elements, a chamber for fluid adjacent said vaned elements for rotation therewith, fluid in said chamber maintained as a fluid ring at the outer periphery of the chamber by centrifugal force during rotation of the chamber, an arm pivotally mounted in said chamber and having a free end extending radially outwardly toward and terminating short of the outer periphery of the chamber, said arm being freely pivotable whereby it extends in a normal straight down position, said fluid ring contacting the outer end of the arm and pivoting the arm away from its normal position when the thickness of the ring exceeds the distance between the end of the arm and the outer periphery of the chamber, and control means operatively connected to the arm and actuated thereby when the arm is pivoted.

4. Fluid level control means for a fluid coupling comprising a working chamber including driving and driven vaned elements, a chamber for fluid adjacent said vaned elements for rotation therewith, fluid in said chamber maintained as a fluid ring at the outer periphery of the chamber by centrifugal force during rotation of the chamber, an arm pivotally mounted in said chamber and having a free end extending radially outwardly and terminating short of the outer periphery of the chamber, means to vary the distance of the outer end of the arm from the outer periphery of the chamber, means urging said arm to a normal position, said fluid ring contacting the outer end of the arm and pivoting the arm away from its normal position when the thickness of the ring exceeds the distance between the end of the arm and the outer periphery of the chamber, and control means operatively connected to the arm and actuated thereby when the arm is pivoted.

5. Fluid level control means for a fluid coupling comprising a working chamber including driving and driven vaned elements, a circular chamber for fluid adjacent said vaned elements for rotation therewith, fluid in said chamber maintained as a fluid ring at the outer periphery of the chamber by centrifugal force during rotation of the chamber, an arm in said chamber pivotally mounted at one end off center of the center of rotation of the chamber, said arm extending radially outwardly toward the outer periphery of the chamber and having a free end terminating short of the outer periphery of the chamber, means urging said arm to a normal position, means to selectively lock the arm in different normal positions whereby the distance between the free end of the arm and the outer periphery of the chamber are varied as the result of the off center pivotal mounting of the arm, said fluid ring contacting the free end of the arm and pivoting the arm away from its normal position when the thickness of the ring exceeds the distance between the free end of the arm and the outer periphery of the chamber, and control means operatively connected to the arm and actuated thereby when the arm is pivoted.

6. Fluid level control means as defined in claim 5 and further characterized in that said arm is pivotally mounted on a shaft, said shaft carrying locking means for locking the arm in different angular positions, and a counterweight on the shaft urging said shaft and arm to a normal position.

7. Fluid level control means for a fluid coupling comprising a working chamber including driving and driven vaned elements, a chamber for fluid adjacent said vaned elements for rotation therewith, fluid in said chamber maintained as a fluid ring at the outer periphery of the chamber by centrifugal force during rotation of the chamber, a shaft extending into said chamber, an arm mounted at one end on said shaft in said chamber and having a free end extending radially outwardly toward and terminating short of the outer periphery of the chamber, means urging said arm to a normal position, said fluid ring contacting the free end of the arm and pivoting the arm away from its normal position when the thickness of the ring exceeds the distance between the free end of the arm and the outer periphery of the chamber, pivoting of said arm causing pivoting of said shaft, a conduit for supplying fluid to said working chamber, a valve in said conduit, said shaft being operably connected to said valve for actuation thereof when the arm is pivoted.

8. A device as defined in claim 7 and further characterized in that said valve comprises a valve element fixedly mounted to the shaft, said valve including a recess in which the valve element is received, said recess permitting pivoting of the valve element, said valve element having an opening therethrough for registry with the conduit when the arm is in its normal position, said valve element being pivoted to a position with said opening out of alignment with said conduit when the arm is pivoted.

9. The device defined in claim 7, and further characterized in that said valve comprises a valve element, said valve including a recess in which said valve element is slidably received, a pin extending from said valve element, a forked element secured to said shaft and engaging said pin, said valve element having an opening therethrough in registry with said conduit when said arm is in its normal position, said valve element being shifted to a position in which said opening is out of registry with the conduit when the arm is pivoted out of its normal position.

10. Fluid level control means for a fluid coupling comprising a working chamber including driving and driven vaned elements, means for operating said fluid coupling in either the clockwise or counterclockwise direction, a chamber for fluid adjacent said vaned elements for rotation therewith, fluid in said chamber maintained as a fluid ring at the outer periphery of the chamber by centrifugal force during rotation of the chamber, an arm pivotally mounted in said chamber and having a free end extending radially outwardly toward and terminating short of the outer periphery of the chamber, means urging said arm to a normal position, said fluid ring contacting the free end of the arm and pivoting the arm away from its normal position in the direction of rotation of the fluid coupling when the thickness of the ring exceeds the distance between the free end of the arm and the outer periphery of the chamber, and means operatively connected to the arm and actuated thereby when the arm is pivoted.

11. Fluid level control means for a fluid coupling comprising a working chamber including driving and driven vaned elements, means for supplying fluid to the working chamber from an external source, a chamber for fluid adjacent said vaned elements for rotation therewith, fluid in said chamber maintained as a fluid ring at the outer periphery of the chamber by centrifugal force during rotation of the chamber, an arm pivotally mounted in said chamber and having a free end extending radially outwardly toward and terminating short of the outer periphery of the chamber, means urging said arm to a normal position, said fluid ring contacting the free end of the arm and pivoting the arm away from its normal position when the thickness of the ring exceeds the distance between the free end of the arm and the outer periphery of the chamber, and valve means operatively connected to the arm and actuated thereby when the arm is pivoted to prevent further supply of fluid to the working chamber.

12. Fluid level control means for a fluid coupling comprising a working chamber including driving and driven vaned elements, a scoop chamber for fluid adjacent said working chamber for rotation with said driving vaned elements, fluid in said scoop chamber maintained as a fluid ring at the outer periphery of the chamber by centrifugal force during rotation of the scoop chamber, means providing fluid flow from the working chamber to the scoop chamber, a scoop tube in said chamber, a cooler for receiving fluid from the scoop tube, means providing fluid flow from the cooler to the working chamber, an external fluid reservoir, means providing fluid flow from the reservoir to the working chamber, an arm pivotally mounted in said scoop chamber and having a free end extending radially outwardly toward and terminating short of the outer periphery of the scoop chamber, means urging said arm to a normal position, said fluid ring contacting the free end of the arm and pivoting the arm away from its normal position when the thickness of the ring exceeds the distance between the free end of the arm and the outer periphery of the scoop chamber, and valve means operatively connected to the arm and actuated thereby when the arm is pivoted to prevent fluid flow from the reservoir to the working chamber.

13. Fluid level control means for a fluid coupling comprising a working chamber including driving and driven vaned elements, a work chamber reservoir adjacent said vaned elements for rotation with said driving element, means providing fluid flow between the work chamber reservoir and the work chamber, a scoop chamber for fluid adjacent said work chamber reservoir for rotation therewith, means providing fluid flow from the work chamber reservoir to the scoop chamber, a scoop tube in said scoop chamber, a cooler for receiving fluid from the scoop tube, means providing fluid flow from the cooler to the working chamber, an external fluid reservoir, means providing fluid flow from the reservoir to the working chamber, fluid in each of said work chamber reservoir and said scoop chamber maintained as a fluid ring at the outer peripheries thereof by centrifugal force during rotation of the chambers, an arm pivotally mounted in each of said chambers and having a free end extending radially outwardly toward and terminating short of the outer peripheries of the chambers, means urging said arms to a norml position, said fluid rings contacting the free ends of the respective arms and pivoting the arms away from their normal positions when the thickness of the rings exceeds the distance between the free ends of the arms and the outer peripheries of the chambers, and control means operatively connected to the arms and actuated thereby when either of the arms is pivoted.

14. Fluid level control means as defined in claim 13 and further characterized in that said scoop tube is movable to a position withdrawn from the fluid ring in the scoop chamber whereby fluid flows from the working chamber into the scoop chamber to declutch the fluid coupling, the arm in the scoop chamber having a length such that the fluid ring in the scoop chamber will contact the free end of the arm in the scoop chamber after sufficient fluid has been removed from the work chamber to cause declutching of the fluid coupling, said arm being thereafter pivotable by the fluid ring to operate the control means and cause discontinuation of fluid flow from the reservoir to the working chamber.

15. Fluid level control means as defined in claim 13 and further characterized in that said scoop tube is movable to a position to exhaust fluid in the scoop chamber whereby the fluid ring in the scoop chamber is reduced in thickness so as to be out of contact with the free end of the arm in the scoop chamber, the arm in the work chamber reservoir having a length such that the free end thereof will contact the fluid ring in the work chamber reservoir when the proper amount of fluid for full clutched operation of the fluid coupling is present in the work chamber and work chamber reservoir and is thereafter pivotable by the fluid ring to actuate the control means to discontinue flow of fluid from the reservoir to the work chamber.

No references cited.

EDGAR W. GEOGHEGAN, *Primary Examiner.*